United States Patent Office 3,234,716
Patented Feb. 15, 1966

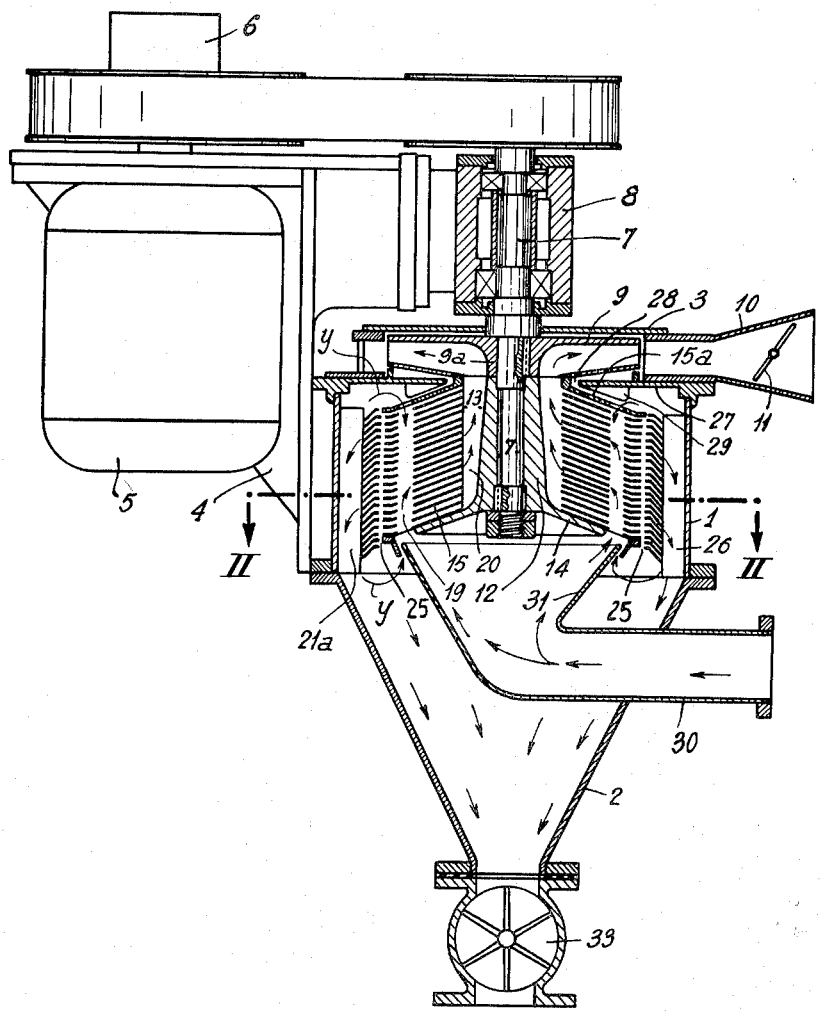

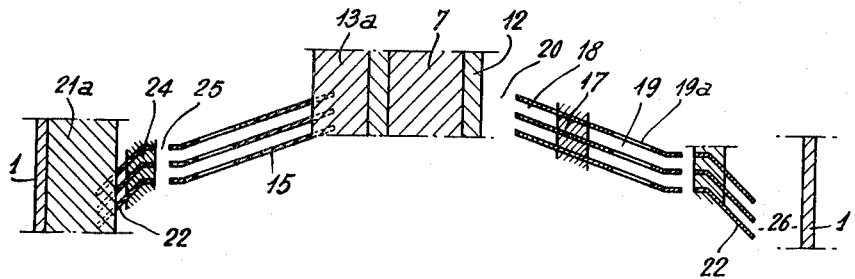
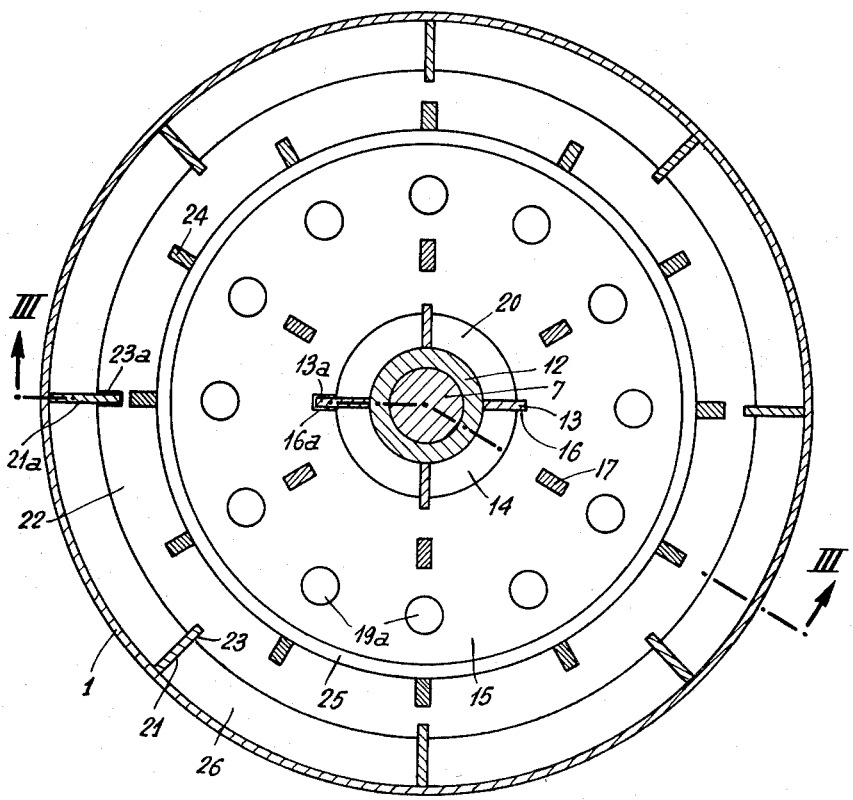

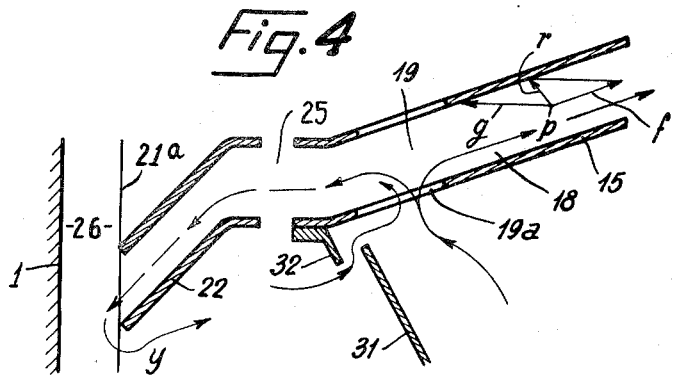
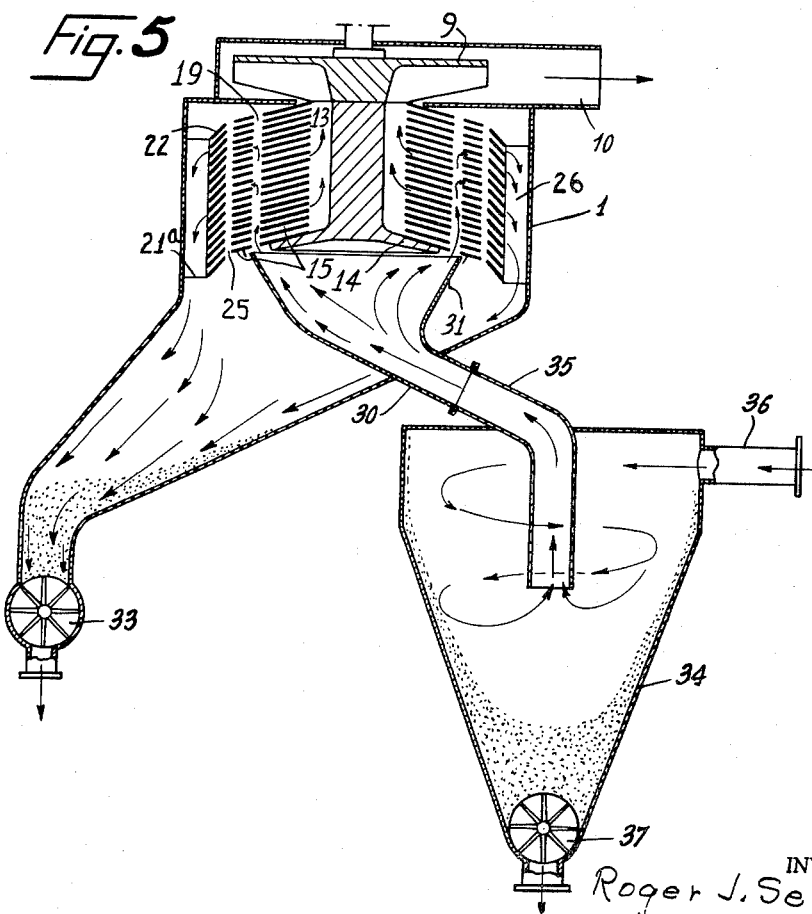

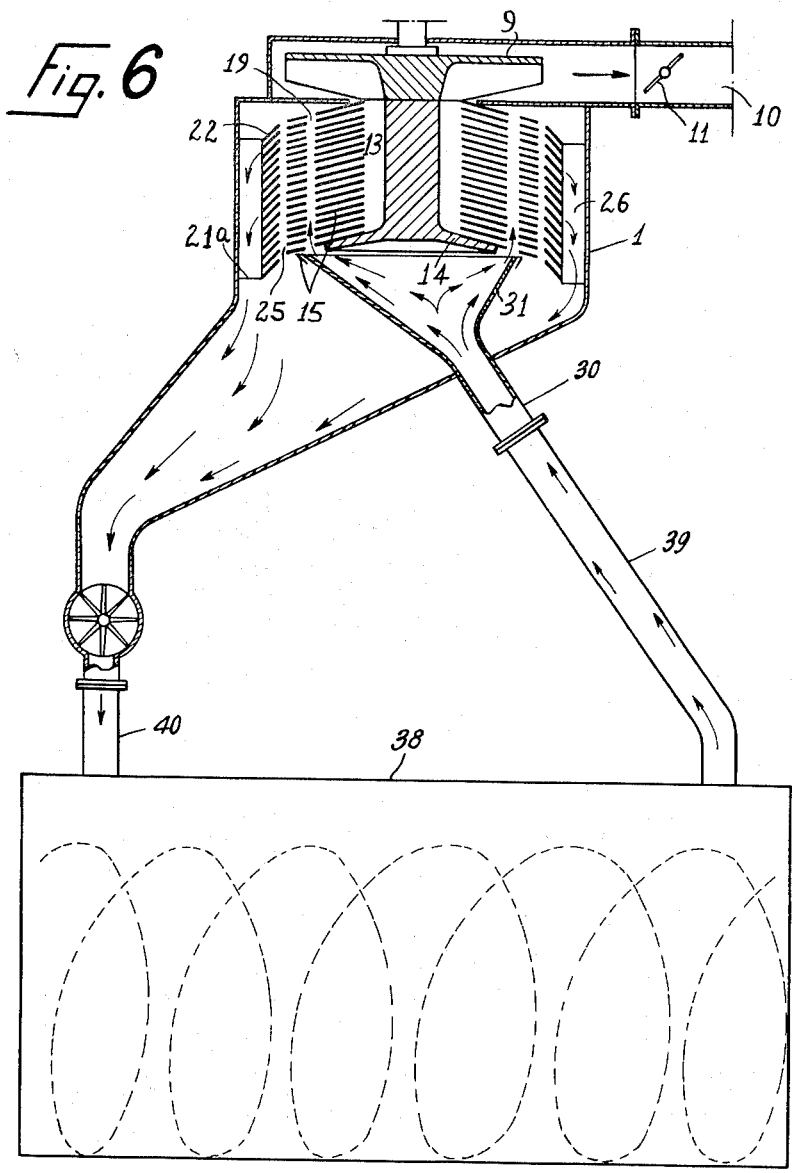

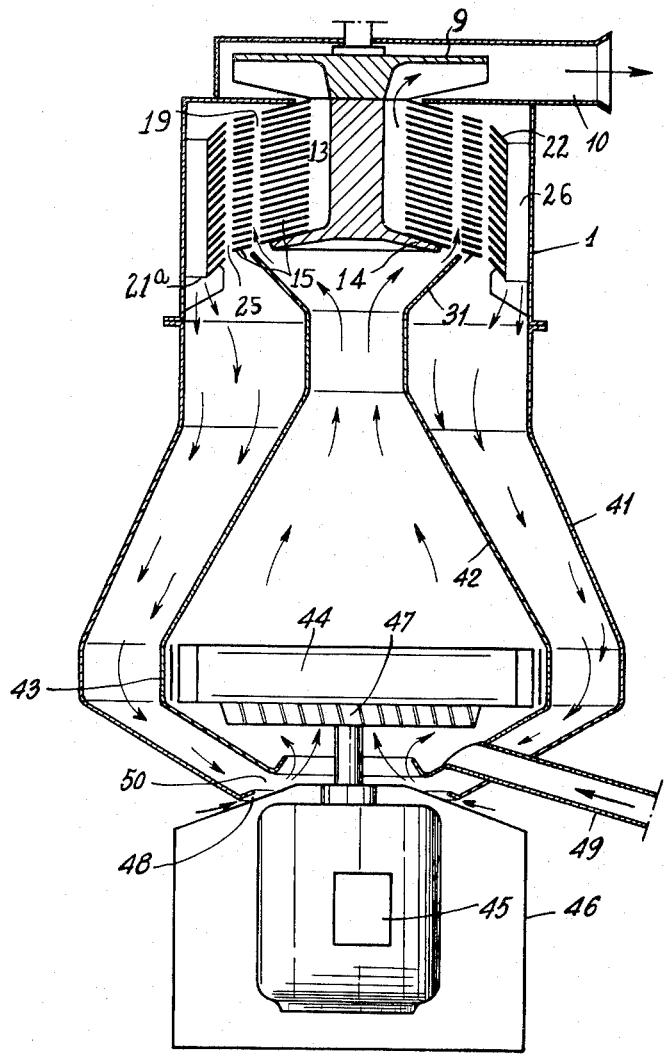

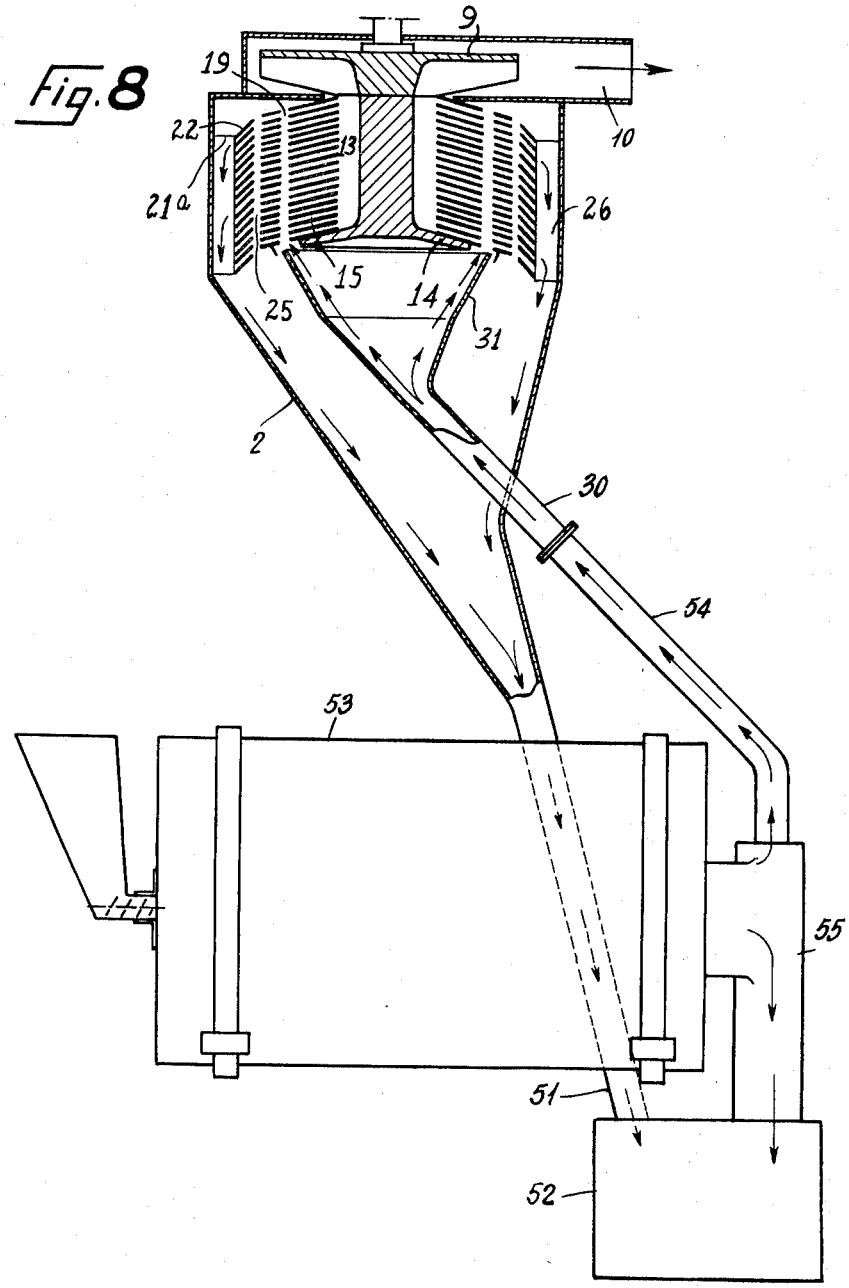

3,234,716
APPARATUS FOR SEPARATING DUST AND OTHER PARTICLES FROM SUSPENSION IN A GAS
Roger Joseph Sevin and George Wilfrid Edwards, both of 63 Rue d'Avron, Paris, France
Filed Nov. 20, 1962, Ser. No. 238,879
Claims priority, application France, Nov. 22, 1961, 879,752
10 Claims. (Cl. 55—317)

This invention concerns separators for separating dust or similar fine solid or liquid particles from gases in which they are contained in suspension.

According to the present invention there is provided a separator for separating dust or other particles from a gas in which they are suspended comprising a rotatable impeller having a plurality of axially spaced apart frusto-conical members between which are spaces which communicate with a common central space adjacent the axis of said impeller, and a fan, rotation of which causes a mixture of gas and suspended particles to flow radially inwardly through said spaces between said members and into said common central space, the centrifugal action of said rotatable impeller causing at least some of said particles to separate from said mixture and flow toward the outer periphery of said frusto-conical members.

Preferably said common central space communicates with the inlet to said fan, operation of which sucks the mixture of air and suspended particles through said spaces.

Advantageously, control means are provided for controlling the speed of the fan and the impeller.

To promote removal of the separated dust, the plates are preferably surrounded by stationary frusto-conical annuli.

The invention is illustrated, merely by way of example, in the accompanying drawings in which:

FIG. 1 is a view in axial section of a dust extractor according to the invention, FIG. 2 is a sectional view taken along the line II—II of FIG 1 but to an enlarged scale, FIG. 3 is a view in partial section taken along the line III—III of FIG. 2, FIG. 4 is a detailed view showing part of the separator of FIG. 1, and FIGS. 5–8 are diagrammatic views showing some uses of the dust extractor.

Referring to FIG 1, a dust extractor comprises a cylindrical casing 1 to which a hopper 2, cover 3 and a bracket 4 are secured, an electric motor 5 being mounted on the bracket 4. By way of a variable-speed control device 6, the motor 5 drives a shaft 7 of an impeller and is mounted in a bearing box 8 coaxially of the casing 1. Rigidly secured to the shaft 7 in the cover 3 is a centrifugal fan 9. The outlet for the fan 9 is constituted by a lateral nozzle 10 fitted to the cover 3 and provided with a control valve 11. A hub 12 having radial fins 13 and a base 14 is rigidly secured to the shaft 7 below the fan 9, One, 13a, of the fins is slightly wider than the others, as can be seen in FIG 2. The cross-section of the hub 12 varies progressively from the base 14 as far as the fan hub 9a.

Frusto-conical plates 15 are stacked above the base 14 around the shaft 7 and are formed with slots 16, 16a for guiding them on the fins 13, 13a respectively (FIG 2). The plates 15 are separated from one another by crosspieces 17 to leave spaces 18 (FIG. 3) between the plates 15. The first plate 15a nearest the fan 9 is thicker than the other plates 15 and bears against the bottom of the fan 9. Near their periphery the plates 15, 15a are pierced with apertures 19a which register with one another in the various plates to provide vertical chimneys 19 (FIGS. 1 and 3) whose bottom entry is disposed beyond the base 14. Vertical spaces 20 are left between the plate edges and the hub 12 to bound a common central space leading to the fan inlet.

Radial fins 21, 21a in the form of rectangles are secured to the side surface of the casing 1 in a vertical position, and frusto-conical annuli 22 formed with slots 23, 23a are stacked and guided on the fins 21, 21a. The annuli 22 are maintained by crosspieces 24 (FIGS. 2 and 3) at the same spaced distances as the plates 15 and in extension thereof, a vertical annular space 25 being left between the plates and the annuli. As can be seen in the drawings, the apex angle of frusto-conical plates 15 is greater than the apex angle of the frusto-conical annuli 22. Also, vertical annularly segmented spaces 26 are left between the outer edges of the rings, the wall of the casing 1 and the fins 21, 21a. A stationary partition 27 is provided below the cover 3 between the fan 9 and the first plate 15a. This partition provides a narrow central annular gap 28, and has fins 29 directed so as to maintain a slight preferential flow of mixture towards the first plate to prevent mixture by-passing said impeller.

A nozzle 30 for supplying gas for treatment extends through the wall of the hopper 2 and terminates, along the impeller axis, in a conical mouthpiece 31 whose top edge registers with the apertures of the chimneys 19. The last plate 15 furthest from said fan 9 has a frusto-conical annular ring 32 which surrounds the edge of the mouthpiece 31 at a reduced distance therefrom. A valve 33, for instance, of the bladed kind, is fitted to the bottom of the hopper 2 in order that the collected products may be removed without any escape of gas, The apparatus just described operates as follows:

The dusty gases are introduced through the nozzle 30 with the impeller and fan 9 rotating. The fan 9 produces suction in the spaces 20 and tends to produce a flow towards the nozzle 10. The impeller plates 15 also produce suction in the spaces 20 and tend to produce centrifugal flows in the passages 18 between the plates. If the action of the fan 9 predominates, the gas in the chimneys 19 is sucked towards the fan exit, and so a centripetal gas flow indicated by arrows in FIG. 1 is set up in the apparatus. If the fan cannot provide sufficient suction, an extra fan can be provided at the exit of the nozzle 10.

FIG 4 shows how dust and other particles can be separated from gas. The particles $p$ are first entrained by the gas flow into the chimneys 19 of the stack of plates 15 where they experience two main velocities—one velocity $f$ produced by the gas flow and directed parallel with the plates along the axis of the impeller, and a velocity $g$ produced by centrifugal force and operative horizontally outwards. The resultant velocity $r$ is also directed outwards towards the uppermost plate 15 provided that the velocity $f$ does not have an excessive effect—i.e., that the centripetal flow is not excessive relatively to the centrifugal flow. The relationship of the velocities of these two factors (the centripetal flow and the centrifugal flow) can be controlled by means of the variable-speed device 6 and the valve 11.

The particles therefore tend to accumulate below each plate 15. The resultant force acting upon the particles is in the same direction as velocity $r$. If the component of this force parallel to the plates 15 is radially outwardly, the particles slide along the bottom surface of the plates 15 towards their periphery. At the same time the cleaned gas flows between the plates 15 towards the common centre space 20 and towards the fan 9. The apparatus can be adjusted to extract all the particles from the gas or to extract only some of the particles, for instance, just the relatively dense or relatively coarse particles. This adjustment depends upon the relationship between the speed of rotation of the fan and impeller and the rate of flow of gas from nozzle 10 as determined by the positioning of valve 11, At the exit from the plates 15, the particles are stopped by the stationary annuli 22 which act as stabilisers; the angle of the annuli 22 is such that the particles slide along the annuli into the spaces 26 to collect in the hopper 2 whence they are removed via the rotary valve 33.

Minor gas stream $y$ is produced in the centrifugal direction between the annuli 22 at the bottom, between the bottom plate and the flared mouthpiece 31, and at the top, between the partition 27 and the plate 15a (FIGS. 1 and 4). These streams prevent the spaces between the rings 22 from becoming blocked and help to carry the particles between the annuli 22 towards the hopper 2.

The apparatus hereinbefore described can be used for either complete or selective collection of solid or liquid particles in suspension in a gas, selectively being controlled by varying the relationship between the centripetal stream between the plates and centrifugal force; for instance, relatively coarse particles can be retained in the apparatus and relatively fine particles can flow along with the gas, or relatively dense particles can be retained and relatively light particles can flow through.

The apparatus can be used alone or in association with other apparatus such as filters, cyclones, mixers, crushers or the equivalent as shown in FIGS. 5 to 8.

Referring to FIG. 5, the apparatus 1 is combined with a cyclone 34 whose exit pipe 35 is connected to the nozzle 30. A gas containing particles in suspension enters the cyclone through a tube 36 and has removed from it therein the relatively coarse or relatively heavy particles which are removed via the valve 37. The cleaned gas issues from the apparatus 1 through the nozzle 10 while the fine or light particles leave through the valve 33.

Referring to FIG 6, the apparatus 1 is combined with a mixer 38. A mixture of gas and of fine ingredients is supplied to the mixer through an inlet (not shown) and is subsequently directed to the nozzle 30 through a duct 39 from the mixer 38, and the fine particles are removed from the gas stream and returned to the mixer through a duct 40 connected to the valve 33.

Referring to FIG 7, the casing 1 of the apparatus is extended by a rounded hopper 41 containing a chimney 42 connected to the flared mouthpiece 31. The chimney 42 forms part of the casing 43 of a rotary crusher 44 driven by a motor 45 disposed in a bottom casing 46. A fan 47 below the crusher sucks in air through an annular gap 48 between the hopper 41 and the casing 46. The fan 37 also sucks in particles for crushing through a duct 49. Through a gap 50 between the hopper 41 and the casing 43, the fan 47 sucks in inadequately crushed particles which are separated in the apparatus 1 from the fine particles. The latter are removed with the vehicle gas through the nozzle 10.

Referring to FIG. 8, the hopper 2 of the device is connected through a duct 51 to the collecting tank 52 of a ball or roller crusher 53 while a gas pipe 54 connects the collecting spout 55 of the tank to the nozzle 30. The very fine particles can be removed through the nozzle 10 in this way, the other particles being returned to the tank 52.

We claim:

1. A separator for separating dust or other particles from a gas in which they are suspended, comprising in combination a vertical, stationary casing having an upper cylindrical portion and provided with a lateral outlet nozzle;

a shaft, mounted for rotation within said portion co-axially therewith, a centrifugal fan secured to said shaft in front of said outlet nozzle;

a hub secured to said shaft below said fan and provided with a flared base;

a plurality of frusto-conical plates stacked above said base around said hub, and uniformly spaced from one another in a vertical direction, an annular space being left around said hub and the uppermost of said plates being connected by its inner periphery to the outlet of said fan, said plates having further an outer diameter greater than the diameter of said base and being provided, outwardly of said base with perforations, the perforations of the various plates being located above one another whereby vertical passages are formed through the plate stack;

frusto-conical annuli secured to said casing around said plates at a distance from the inner wall of said casing, the inner edge of each said annuli being respectively located at the same level as the outer edge of each said plates; and a gas inlet nozzle extending through the lower part of said casing and terminating below said base in a conical mouth piece substantially coaxial with said casing.

2. The separator of claim 1 wherein the outer diameter of said mouth piece is greater than that of said base but smaller than that of the lowermost plate, said plate being provided with an inverted frusto-conical annular ring surrounding the edge of said mouth piece.

3. The separator of claim 1 wherein said frusto-conical plates have an apex angle greater than that of said frusto-conical annuli.

4. The separator of claim 1 wherein an annular partition is provided within said casing between said uppermost plate and said fan, an annular gap being left between said partition and said plate and fan, and radially directed fins being secured to said partition.

5. The separator of claim 1 wherein means are provided for controlling said outlet nozzle.

6. The separator of claim 1 wherein means are provided for rotating said shaft, including means to controllably vary the speed of said shaft.

7. The separator of claim 1 wherein said gas inlet nozzle is connected to the gas outlet nozzle of a cyclone into which a mixture of gas and dust or other particles is to be sent.

8. The separator of claim 1 wherein said casing has a downwardly tapering lower portion and said portion is conected to an inlet duct of a mixer the outlet of said mixer being connected to said gas inlet nozzle whereby fine particles escaping from said mixer may be returned to the mixture.

9. The separator of claim 1 wherein said casing has an enlarged lower portion provided with a lower opening said lower portion containing a chimney the upper part of which is connected to said gas inlet nozzle and the lower edge of which defines an annular opening with said lower portion of said casing: a rotary crusher mounted for rotation about a vertical axis within said chimney, a fan mounted for rotation co-axially with and below said crusher for sucking air through said annular opening and blowing it to said crusher, means for driving said crusher and fan; and means for introducing a mixture of air and dust or the like particles into said chimney, below said fan co-axial to said crusher.

10. The separator of claim 1 wherein said casing has a downwardly tapering lower portion; a crusher provided with a collecting spout leading to a collecting tank and duct means for connecting said lower portion to said collecting tank and said gas inlet nozzle to said collecting spout, whereby the finest particles escaping from said spout may be removed, other particles being returned to said tank.

(References on following page)

References Cited by the Examiner

UNITED STATES PATENTS

| | | | |
|---|---|---|---|
| 465,543 | 12/1891 | Shelley | 55—400 |
| 2,031,734 | 2/1936 | Riebel et al. | 55—407 |
| 2,104,683 | 1/1938 | Rosen et al. | 55—403 |
| 2,126,481 | 8/1938 | Lapp et al. | 55—403 |

FOREIGN PATENTS

| | | |
|---|---|---|
| 967,566 | 3/1950 | France. |
| 1,049,466 | 8/1953 | France. |

ROBERT F. BURNETT, *Primary Examiner.*

HARRY B. THORNTON, *Examiner.*